Figure 3:
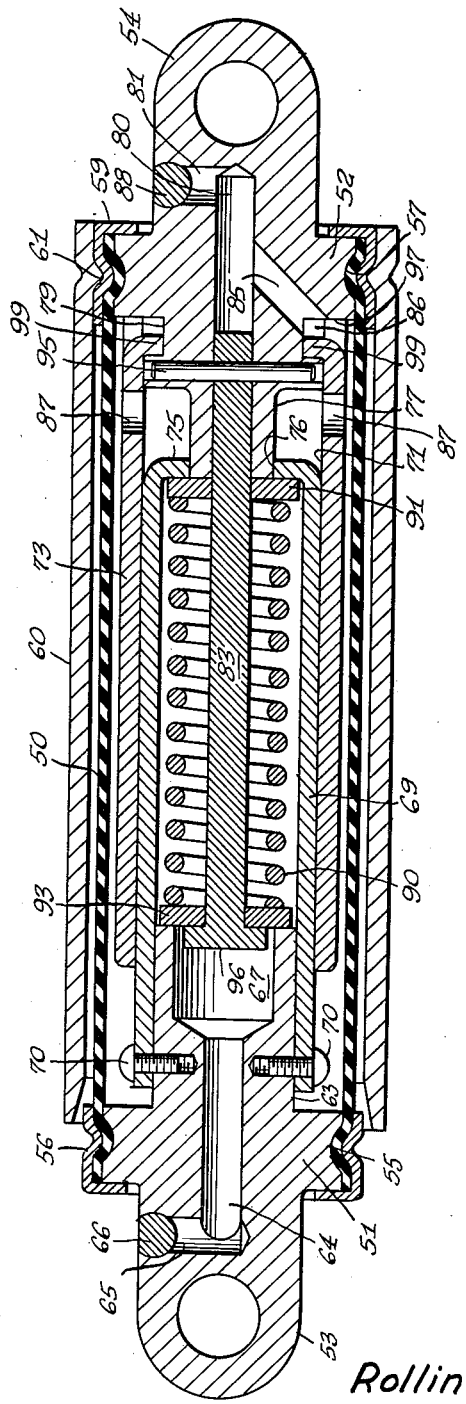

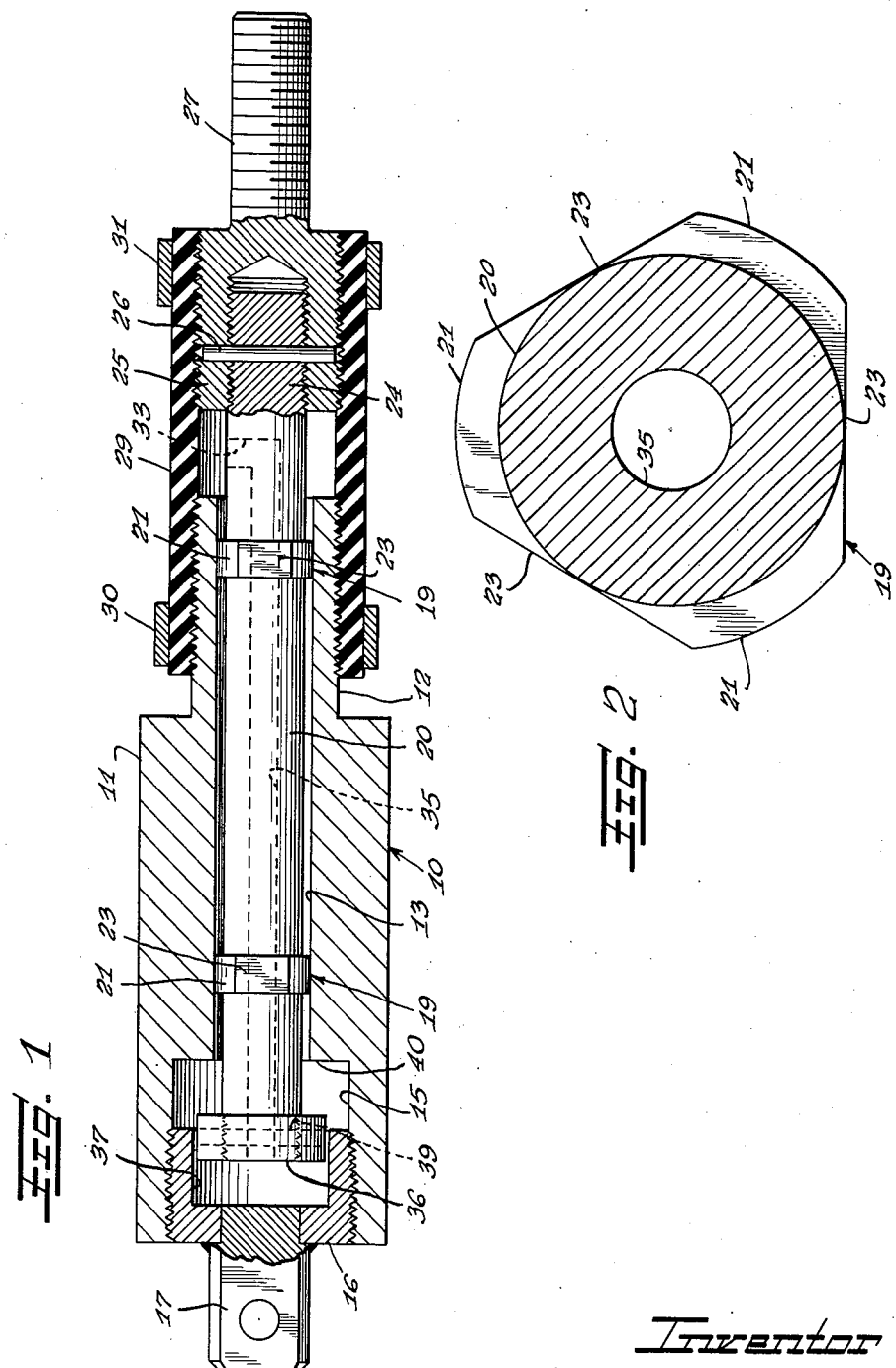

June 5, 1962 R. D. RUMSEY 3,037,761
LINEAR VISCOUS DAMPER
Filed March 21, 1960 2 Sheets-Sheet 2

Inventor
Rollin Douglas Rumsey

United States Patent Office 3,037,761
Patented June 5, 1962

3,037,761
LINEAR VISCOUS DAMPER
Rollin Douglas Rumsey, Buffalo, N.Y., assignor to Houdaille Industries, Inc., Buffalo, N.Y., a corporation
Filed Mar. 21, 1960, Ser. No. 16,548
3 Claims. (Cl. 267—8)

This invention relates to improvements in linear dampers and more particularly relates to an improved form of linear viscous damper.

A principal object of the invention is to provide a simple and improved form of linear damper utilizing the shear resistance of a viscous fluid to resist motion between the working parts of the damper.

A further object of the invention is to provide a simplified form of linear viscous damper in which a high shear strength silicone damping fluid forms a motion resisting film between the working parts of the damper.

Still another object of the invention is to provide a linear viscous damper utilizing the high shear strength of a viscous fluid to resist motion between the working parts of the damper, and so constructed as to eliminate the use of sliding seals between the working parts of the damper.

Still another object of the invention is to provide a simplified form of linear viscous damper utilizing a high shear strength silicone fluid to resist relative motion of the parts of the damper, in which a resilient tubular member connected between the working parts of the damper seals the damping fluid within the damper and accommodates rectilinear and rotational motion of the working parts of the damper with respect to each other.

These and other objects of the invention will appear from time to time as the following specification proceeds and with reference to the accompanying drawings wherein:

FIGURE 1 is a partial diagrammatic longitudinal sectional view taken through a damper constructed in accordance with the invention;

FIGURE 2 is an enlarged sectional view taken through the damping piston and illustrating the guide therefor, arranged to maintain a uniform clearance for the film of viscous damping fluid in all conditions of operation of the damper; and FIGURE 3 is a longitudinal sectional view taken through a modified form and damper constructed in accordance with the invention, in which a centering spring is used to center the parts of the damper with respect to each other.

In the embodiment of the invention illustrated in FIGURES 1 and 2 of the drawing, reference character 10 designates generally a direct acting damper of the linear viscous type. The damper 10 comprises generally a tubular housing member 11 having a reduced diameter open end portion 12, threaded for substantially the length thereof and having a damping chamber 13 extending therealong. The damping chamber 13 is normally filled with hydraulic damping fluid and opens at one end through the reduced diameter end portion 12 of the housing. Said damping chamber opens at its opposite end into an enlarged diameter chamber 15. The enlarged diameter chamber 15 opens to the end of the housing 11 and is closed by a threaded plug 16, having a connector 17 extending outwardly therefrom, and adapted to be connected to either a stationary or movable part of the structure to be damped.

Centering guides 19 are spaced along the piston 20, inwardly from opposite ends of said piston and slidably engage the wall of the damping chamber 13. Said centering guides have circumferential portions or lands 21 slidably engaging the wall of the chamber and connected together by flattened portions 23 tangential of the piston 20 and forming shear clearance spaces for the viscous damping fluid, accommodating shearing of the viscous damping fluid between the piston 20 and wall of the damping chamber 13 upon relative movement of the parts of the damper with respect to each other, and thereby resisting relative movement between the working parts of the damper. The circumferential portions 21 of the centering guides 19 thus maintain a uniform clearance between the piston 20 and damping chamber 13.

It should be understood that while a substantial clearance is shown between the piston 20 and wall of the damping chamber 13, for illustrative purposes, that the actual clearance may be between .001 and .01 inch depending upon the service requirements of the damper.

An outer end portion 24 of the piston 20 projects beyond the reduced diameter end portion 12 of the damper housing and has a connector 25 threaded thereon and retained in position thereon as by a pin 26. The connector 25 is shown as having a reduced diameter outer end portion 27 which may be threaded for connection with a stationary or movable part of the structure to be damped.

The connector 25 is connected with the reduced diameter end portion 12 of the housing member 11 by a flexible tubular member 29, which may be in the form of a rubber hose, and is mounted on the threaded reduced diameter end portion 12 of the housing member 11, and clamped there to a hose clamp 30. The periphery of the connector 25 is also threaded and fits within the flexible tubular member or hose 29 and is clamped thereto as by a hose clamp 31.

The flexible tubular member or hose 29 thus forms a closure for the reduced diameter open end portion 12 of the damper, and is free to expand and contract upon relative motion of the parts of the damper with respect to each other. The hose 29 also accommodates limited rotational movement of the housing member 11 and connector 25 with respect to each other.

A cross passageway 33 is formed in the piston 20 in the space between the end of the open ended reduced diameter portion 12 and the inner end of the connector 25. The cross passageway 33 has communication with an axial passageway 35 extending along the piston 20 from the cross passageway 33 and opening into the enlarged diameter chamber 15 in the damper housing, to accommodate the passage of damping fluid from one side of the damping chamber to the other as the damping piston reciprocably moves within the damping chamber. A collar 36 is mounted on the opposite end of the piston 20 from the connector 27 and extends within a chamber portion 37 formed in the threaded plug 16, and is of a larger diameter than the damping chamber 13. A pin such as a roll pin 39 fixedly connects the collar 36 to the damping piston 20 and thereby accommodates the collar 36 to limit relative movement between the housing member 11 and piston 20 in either direction, by engagement with the end of the chamber portion 37 of the threaded plug 16 and with an annular wall 40 connecting the wall of the damping chamber 13 with the wall of the enlarged diameter chamber portion 15.

In the embodiment of the invention illustrated in FIGURE 3, a tubular resilient boot or sleeve 50 forms the damper housing and is sealed at its opposite ends to end closure members 51 and 52 having connectors 53 and 54 extending outwardly from respective of said end closure members for connection between two relatively movable parts to be damped.

The resilient sleeve 50 may be made from rubber or one of the well known substitutes for rubber and is pressed into engagement at one end with a groove 55 extending about the periphery of the end closure member 51 by means of an annular clamp 56. The opposite end of the sleeve 50 is clamped into engagement with a recess 57 extending about the end closure member 52 by means of an annular clamp 59. A cover 60 for the damper is shown as being crimped to a crimped groove 61 in the clamp 59, and crimping the sleeve into engagement with the end closure 52. The cover 60 may be made from any well known material. A preferred material is a thermoplastic material which may be heated around one end thereof to secure the cover to the crimped groove 61. The cover 60 is spaced from the boot 50 a sufficient distance to accommodate contraction of said boot and operation of the damper without interference.

The end closure 51 has a hollow boss 63 leading inwardly therefrom having a passageway 64 leading therealong and communicating at its outer end with a cross passageway 65. The passageways 64 and 65 are provided to accommodate filling of the damper with damping fluid. When the damper is once filled, the cross passageway 65 is sealed as by a ball seal 66 of a well known form, which may be resistance welded to the connector 53. The passageway 64 opens at its inner end into an enlarged diameter chamber 67 opening to the interior of the damper. The boss 63 is shown as having a hollow piston 69 extending thereabout and inwardly therefrom. The hollow piston 69 may be secured to the boss 63 at the inner end of said piston as by drive pins 70 or any other suitable securing means. The hollow piston 69 is in the form of a sleeve extending inwardly of and along a cylindrical wall 71 of a sleeve or cylinder 73.

The hollow piston 69 has an inturned inner end portion 75 terminating in a generally cylindrical opening 76 slidably engaging a reduced diameter portion 77 of a boss 79 extending inwardly of the end closure 52. The reduced diameter portion 77 of the boss 79 thus forms a guide for the piston 69.

The end closure 52 has a passageway 80 extending axially therealong from a cross passageway 81 in the connector 54. The passageway 80 is closed at its inner end by a rod 83 extending inwardly of the reduced diameter portion 77 of the boss 79 within the enlarged diameter portion 67 of the boss 63. A passageway 85 leads from the axial passageway 80 to a groove 86 extending about the boss 79 to supply damping fluid to the damper through cross-drilled passageways 87 in the sleeve 73 and leading to the hollow interior thereof. The passageway 81 is closed at its outer end by a ball type seal 88, like the ball type seal 66.

A compression spring 90 extends along the rod 83 and is provided to bias the damper in the extended position shown in FIGURE 3. The compression spring 90 abuts a washer 91 at one end abutting the inner end of the reduced diameter portion 77 of the boss 79. The spring 90 abuts a washer 93 at its opposite end abutting the inner end of the boss 63. The washers 91 and 93 are slidable on the rod 83. The rod 83 is retained to the boss 79 as by a pin 95 extending transversely through the boss 79 and the inner end portion of the rod 83. Extensible movement of the spring 90 is limited by a head 96 on the inner end of the rod 83 and abutting the washer 93.

The sleeve 73 abuts a shoulder portion 97 of the end closure 52 and has a plurality of tangs 99 pressed inwardly therefrom into the groove 86 and retaining said sleeve to the boss 79.

Shear clearance for the viscous damping fluid is provided between the inner cylindrical wall 71 of the sleeve 73 and the outer wall of the piston 69 to provide a shear area for the viscous damping fluid, resisting motion between said cylinder and piston and the connectors 53 and 54 connected to the relatively movable parts to be damped.

The damping fluid may be a silicone fluid such as, the Dow Corning type 200, 100,000 centistokes silicone fluid, while the spring 90 is preloaded to a minimum value sufficient to provide a centering force on the damper and is forced into compression upon either extension or contraction of the damper.

It should here be noted that the modified form of viscous damper just described, like the viscous damper illustrated in FIGURES 1 and 2 may damp linear and angular vibration solely by the high shear strength of the silicone damping fluid forming a motion resisting film between the piston 69 and inner cylindrical wall 71 of the sleeve 73, resulting in an exceedingly simple compact and efficient vibration damper having far less movable parts than former dampers which have been provided to attain similar results.

It may also be seen that the viscous damping fluid is retained within the damper by the resilient sleeve or boot forming a hermetical seal for the damper and eliminating leakage through the sliding seals heretofore considered necessary to seal the moving parts of the damper, and that the flexible sleeve also accommodates angular as well as linear motion of the moving parts of the damper with respect to each other.

It may still further be seen that by the selection of the proper silicone damping fluid, there may be little, if any, variation in the efficiency of the damper over a wide range of temperature variations.

It will be understood from the foregoing that various variations and modifications in the invention may be attained without departing from the spirit and scope of the novel concepts thereof, as defined by the claims appended hereto.

I claim as my invention:

1. In a linear viscous damper, a. two aligned members adapted to be connected to two relatively movable parts to damp vibration thereof,
   b. a cylinder extending from one member,
   c. a piston extending from the other member within said cylinder,
   d. there being shear clearance for viscous damping fluid between said cylinder and piston,
   e. a resilient sleeve connecting said members together and sealed thereto at its ends and enclosing said cylinder and piston,
   f. means including a preloaded centering spring between said members and maintaining said members in centered relation with respect to each other,
   g. the space within said sleeve having a viscous damping fluid having a high shear resistance solidly filled therein, whereby said damper is operable in any desired attitude and resistance to relative movement between said cylinder and said piston is attained by the high shear resistance of the film of damping fluid in the clearance space between said cylinder and said piston.

2. In a linear viscous damper, a. a resilient radially and axially expansible and contractible housing,
   b. an end closure member closing one end of said housing,
   c. a second end closure member closing the opposite end of said housing,
   d. a cylindrical sleeve extending from said second end closure member within said housing,
   e. a piston extending from the first mentioned end closure member within said sleeve,
   f. there being shear clearance for viscous damping fluid between said piston and the inner wall of said sleeve,
   g. said housing having a viscous damping fluid solidly filled therein whereby resistance to relative movement between said piston and said sleeve is attained by the high shear resistance of the film of damping fluid in the clearance space between said piston and the inner cylindrical wall of said sleeve and whereby said damper may be operated in various selected attitudes, h. and means including a preloaded centering spring between said members maintaining said piston and said sleeve in centered relation with respect to each other.

3. In a linear viscous damper, a. a resilient expansible and contractible housing,
b. a first closure member closing one end of said housing,
c. a second closure member closing the opposite end of said housing,
d. a cylindrical sleeve extending from said second closure member within said housing toward said first closure member and having an inner cylindrical wall,
e. a piston extending inwardly from said first closure member along the interior cylindrical wall of said sleeve,
f. a slidable guiding connection between the inner end of said piston and said second closure member,
g. a rod secured to and extending from said second closure member along the interior of said piston toward said first closure member,
h. abutment members on said rod,
i. a centering spring encircling said rod and seated at its opposite ends on said abutment members,
j. one abutment member having abutting engagement with said piston,
k. a head on the inner end of said rod abutted by the other of said abutment members and limiting the extensible movement of said spring and cooperating with said closure members to put said spring under compression in each direction of operation of said damper,
l. said spring being preloaded to a minimum value to center said piston and sleeve with respect to each other,
m. there being shear clearance for viscous damping fluid in the space between said piston and the interior cylindrical wall of said sleeve,
n. and said resilient housing maintaining a viscous damping fluid having a high shear resistance within said cylinder and piston, whereby resistance to relative movement between said piston and said sleeve in axial and angular directions is attained by the high resistance of the film of damping fluid in the clearance space between said piston and the interior cylindrical wall of said sleeve.

References Cited in the file of this patent

UNITED STATES PATENTS

| | | |
|---|---|---|
| 2,506,726 | Magrum | May 9, 1950 |
| 2,661,207 | Allinquant | Dec. 1, 1953 |
| 2,828,960 | Lucien et al. | Apr. 1, 1958 |
| 2,925,263 | Blythe | Feb. 16, 1960 |
| 2,984,479 | Trumper | May 16, 1961 |

FOREIGN PATENTS

| | | |
|---|---|---|
| 758,310 | Great Britain | Oct. 3, 1956 |
| 1,153,671 | France | Oct. 14, 1957 |